(12) United States Patent
Matsuda et al.

(10) Patent No.: US 6,268,872 B1
(45) Date of Patent: Jul. 31, 2001

(54) CLIENT APPARATUS, IMAGE DISPLAY CONTROLLING METHOD, SHARED VIRTUAL SPACE PROVIDING APPARATUS AND METHOD, AND PROGRAM PROVIDING MEDIUM

(75) Inventors: Koichi Matsuda, Tokyo; Hiroyuki Hanaya, Saitama, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/081,147

(22) Filed: May 19, 1998

(30) Foreign Application Priority Data

May 21, 1997 (JP) .................................................. 9-147196

(51) Int. Cl.[7] .................................................. G06T 15/70
(52) U.S. Cl. .......................................................... 345/473
(58) Field of Search .................................... 345/473, 419, 345/418

(56) References Cited

U.S. PATENT DOCUMENTS

| | | | |
|---|---|---|---|
| 5,572,646 | * | 11/1996 | Kawai et al. .......................... 395/501 |
| 5,586,257 | * | 12/1996 | Perlman .................................. 463/42 |
| 5,727,950 | * | 3/1998 | Cook et al. ............................ 434/350 |
| 5,754,740 | * | 5/1998 | Fukuoka et al. ...................... 395/68 |
| 5,761,644 | * | 6/1998 | Ueda et al. ............................. 705/1 |
| 5,850,352 | * | 12/1998 | Moezzi et al. ...................... 364/514 A |
| 5,956,028 | * | 9/1999 | Matsui et al. ......................... 345/329 |
| 5,956,038 | * | 9/1999 | Rekimoto .............................. 345/419 |
| 5,956,485 | * | 9/1999 | Perlman ........................... 395/200.34 |
| 5,966,129 | * | 10/1999 | Matsukuma et al. ................. 345/418 |
| 5,966,526 | * | 10/1999 | Yokoi ............................... 395/500.32 |
| 5,971,855 | * | 10/1999 | Ng .......................................... 463/42 |
| 5,982,372 | * | 11/1999 | Brush, II et al. .................... 345/418 |
| 5,983,003 | * | 11/1999 | Lection et al. ................... 395/200.32 |

* cited by examiner

*Primary Examiner*—Mark Zimmerman
*Assistant Examiner*—Mano Padmanabhan
(74) *Attorney, Agent, or Firm*—Oblon, Spivak, McClelland, Maier & Neustadt, P.C.

(57) ABSTRACT

An avatar acting in a shared virtual space is changed in a manner nearly resembling that in a real space. A client PC, along with another client PC, is connected to a shared server through the Internet to receive data about the shared virtual space constituted by a VRML file from the shared server and displays the received data on a CRT monitor. A virtual life object (called an avatar), the alter ego of a user, is changed based on a growth parameter that changes according to occurrence of an event. A hard disk holding a growth parameter control table stores growth parameters updated by an event caused by an operation performed on own client apparatus or another client apparatus or an event caused by passing of predetermined time. The update growth parameter is also transferred to another client PC through the shared server.

12 Claims, 19 Drawing Sheets

FIG.2

ROUTE Node Name.event Out Name TO Node Name.event In Name (ROUTE DECLARATION) (NODE NAME) (EVENT-OUT NAME) (NODE NAME) (EVENT-IN NAME)

FIG. 14
MOOD INDEX
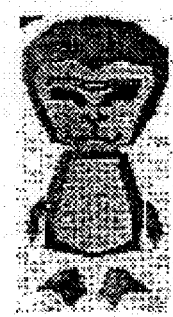
GOOD
↑
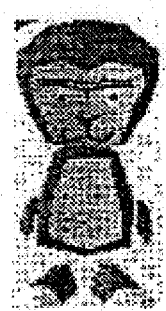
↓
BAD
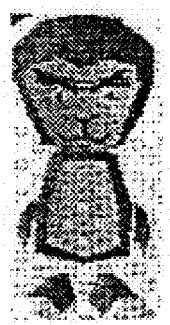

CLIENT APPARATUS, IMAGE DISPLAY CONTROLLING METHOD, SHARED VIRTUAL SPACE PROVIDING APPARATUS AND METHOD, AND PROGRAM PROVIDING MEDIUM

BACKGROUND OF THE INVENTION

The present invention relates to a client apparatus, an image display controlling method, a shared virtual space providing apparatus and a method thereof, and program providing medium.

A cyberspace service named Habitat (registered trademark) is known in so-called personal computer communications services such as NIFTY-Serve (registered trademark) of Japan and CompuServe (registered trademark) of US in which a plurality of users connect their personal computers via modems and public telephone networks to the host computers installed at the centers of the services to access them in predetermined protocols.

Development of Habitat started in 1985 by Lucas Film of the US, operated by Quantum Link, one of US commercial networks, for about three years. Then, Habitat started its service in NIFTY-Serve as Fujitsu Habitat (trademark) in February 1990. In Habitat, users can send their alter egos called avatars (the incarnation of a god figuring in the Hindu mythology) into a virtual city called Populopolis drawn by two-dimensional graphics to have a chat (namely, a realtime conversation based on text entered and displayed) with each other. For further details of Habitat, refer to the Japanese translation, pp. 282–307, of "Cyberspace: First Steps," Michael Benedikt, ed., 1991, MIT Press Cambridge, Mass., ISBN0-262-02327-X, the translation being published Mar. 20, 1994, by NTT Publishing, ISBN4-87188-265-9C0010.

In the conventional cyberspace systems operated by personal computer communications services such as mentioned above, a virtual street and the inside of a room for example are drawn in two-dimensional graphics. Therefore, moving an avatar in the depth direction is realized simply by moving it up and down in the background of the two-dimensional graphics. This results in a poor expression in simulating walking and movement in a virtual space. Also, the two-dimensional virtual space in which own avatar and the avatar of another user are displayed is viewed from a viewpoint of a third party, thereby impairing the sense of simulated experience.

To overcome this drawback, a capability that enables a user to walk as desired with the viewpoint of the avatar of the user in a virtual space represented in three-dimensional graphics is realized by use of a three-dimensional graphics data description language called VRML (Virtual Reality Modeling Language) as disclosed in Japanese Patent Laid-open No. Hei 9-81781 corresponding to U.S. patent application Ser. No. 678,340. Considerations about various cyberspaces in which chat is made by use of the avatar of a user are described in NIKKEI Electronics, Sep. 9, 1996, No. 670, pp. 151–159.

Recently, breeding simulation games for breeding tropical fish and a virtual creature having artificial intelligence living in a virtual world for example have come to be available as personal computer software programs. A product is also known that displays a simulated pet such as a dog or a cat on an electronic notepad to enjoy the process of its growth (refer to NIKKEI Electronics, Apr. 7, 1997, No. 686, pp. 131–134). In addition, "Tamagotchi" (registered trademark) developed and commercialized by Bandai Co. is widely known that is an egg-sized portable virtual reality pet with a breeding simulation game program as mentioned above incorporated.

Virtual reality pets of this type have a CPU (Central Processing Unit), a ROM (Read Only Memory), a RAM (Random Access Memory) and so on mounted on a single-chip LSI (Large Scale Integration), a breeding simulation game program being stored in the ROM, the figure and state of the pet being displayed on an LCD (Liquid Crystal Display) device. The user gives such instructions by operating buttons as "feed" and "broom" for example necessary for breeding the virtual reality creature as a pet. As a result of caring, the virtual reality creature displayed on the LCD grows stepwise from an egg to a chick to a grown-up bird for example in its external view.

The virtual reality creature is programmed such that proper instructions given help the virtual reality creature grow without problem and improper instructions given make it sick or, in the worst case, die. Further, the virtual reality creature is programmed to make various requests based on the time elapsing from its birth provided by an incorporated calendar timer. For example, in the nighttime zone, the virtual reality creature requests a sleep and, in the mealtime zone, it requests food. In other times, the virtual reality creature requests, at random, snack and play for example. If the user fails to answer these requests properly, the growth of the virtual reality creature may be retarded or its character worsens. If the user answers properly, the life of the virtual reality creature is lengthened.

Meanwhile, Japanese Patent Laid-open No. Hei 07-160853 corresponding to U.S. Pat. No. 5,572,646 discloses a technology applicable to an electronic notepad for example for displaying images according to the growth processes of a virtual reality creature such as an animal or a plant. To be more specific, bit-map images representing the growth processes of a plant character for example are stored in the ROM in the electronic notepad. The plant character according to the degree of growth is displayed on the LCD of the electronic notepad and, at the same time, characters representing plant growing elements (water, light, and fertilizer for example) are displayed. Necessary amounts of these growing elements are inputted by operating corresponding keys on the electronic notepad. The inputted values are set to a water amount register, a light amount register, and a fertilizer amount register respectively in the RAM of the electronic notepad. Based on the values set to these registers, a new degree of growth is computed. Then, the plant character corresponding to the computed degree of growth is read from the ROM to be displayed on the LCD. Thus, the plant growth process according to the state of cultivation by the user is displayed.

The avatar to be sent into the above-mentioned cyberspace as the alter ego of a user can take on any appearance that the user desires. However, this avatar is not endowed with capabilities such as changing its own appearance with time or forming its unique character as instructed by the user in order to autonomously change its behavior. Thus, the behavior of the avatar is completely different from that of human being in the real world.

If an attempt is made to express the growth process of an avatar by use of the image displaying method for the above-mentioned portable virtual reality pet or the virtual reality creature disclosed in Japanese Patent Laid-open No. Hei 07-160853, the following problem will be caused. Namely, in the image displaying method for the virtual reality creature disclosed in Japanese Patent Laid-open No. Hei 07-160853 for example, the bit-map images representing the growth process stages of the character of the virtual reality creature are stored beforehand in the ROM. Then, according to the degree of growth, the character of the virtual reality creature is altered stepwise. Therefore, this approach cannot dynamically alter the creature's appearance according the change in height and weight for example taking place in the growth process of the creature. Implementing this dynamic alteration, if possible, requires a preparation of huge amounts of bit map images beforehand, which is not realistic.

SUMMARY OF THE INVENTION

It is therefore an object of the present invention to realize a shared virtual space providing system in which the appearance of an avatar sent into a cyberspace as the alter ego of a user can be grown as time passes, the behavior of the avatar can be autonomously changed by forming a unique character by the user to express a growth process close to that of a real creature, and this growth representing capability of the avatar can be realized with a minimum image information resource.

In carrying out the invention and according to one aspect thereof, there is provided a client apparatus including: a storage means for storing a growth parameter control table for controlling a growth parameter of a virtual life object existing in the shared virtual space as an alter ego of a user, the growth parameter changing according to occurrence of a particular event; an interpreting means for interpreting a script for dynamically changing one or both of an appearance and a behavioral sequence of the virtual life object based on the growth parameter transmitted from the another client apparatus through the server; and a controlling means for controlling display such that the virtual life object is displayed according to the growth parameter.

In carrying out the invention and according to another aspect thereof, there is provided an image display control method including the steps of: storing a growth parameter control table for controlling a growth parameter of a virtual life object existing in the shared virtual space as an alter ego of a user, the growth parameter changing according to occurrence of a particular event; interpreting a script for dynamically changing one or both of an appearance and a behavioral sequence of the virtual life object based on the growth parameter transmitted from the another client apparatus through the server; and controlling display such that the virtual life object is displayed according to the growth parameter.

In carrying out the invention and according to still another aspect thereof, there is provided a program providing medium, providing a program including the steps of: storing a growth parameter control table for controlling a growth parameter of a virtual life object existing in the shared virtual space as an alter ego of a user, the growth parameter changing according to occurrence of a particular event; interpreting a script for dynamically changing one or both of an appearance and a behavioral sequence of the virtual life object based on the growth parameter transmitted from the another client apparatus through the server; and controlling display such that the virtual life object is displayed according to the growth parameter.

In carrying out the invention and according to still another aspect thereof, there is provided a shared virtual space providing apparatus including: a receiving means for receiving, when a first client apparatus updates a growth parameter, which changes as a predetermined event occurs, of a virtual life object existing in the shared virtual space as an alter ego of a user, the updated growth parameter; and a transferring means for transferring the updated growth parameter received by the receiving means to a second client apparatus.

In carrying out the invention and according to yet another aspect thereof, there is provided a shared virtual space providing method including the steps of: receiving, when a first client apparatus updates a growth parameter, which changes as a predetermined event occurs, of a virtual life object existing in the shared virtual space as an alter ego of a user, the updated growth parameter; and transferring the updated growth parameter received by the receiving means to a second client apparatus.

In carrying out the invention and according to a different object thereof, there is provided a program providing medium providing a program including the steps of: receiving, when a first client apparatus updates a growth parameter, which changes as a predetermined event occurs, of a virtual life object existing in the shared virtual space as an alter ego of a user, the updated growth parameter; and transferring the updated growth parameter received by the receiving means to a second client apparatus.

According to the client apparatus, the image display controlling method, and the program providing medium, a growth parameter table for controlling the growth parameters that change every time a predetermined event occurs of a virtual life object, which is the alter ego of a client existing in a shared virtual space is stored, thereby allowing the virtual life object to easily and surely change and grow according to events.

According to the shared virtual space providing apparatus, the shared virtual space providing method, and the program providing medium, an updated growth parameter transmitted from a first client apparatus is transferred to a second client apparatus. Consequently, a system for growing and changing a virtual life object in a shared virtual space according to events can be realized simply and surely.

BRIEF DESCRIPTION OF THE DRAWINGS

These and other objects of the invention will be seen by reference to the description, taken in connection with the accompanying drawing, in which:

FIG. 2 is a diagram illustrating a routing;

FIG. 14 is a diagram for describing avatar mood index;

DETAILED DESCRIPTION OF PREFERRED EMBODIMENTS

Figure 1:
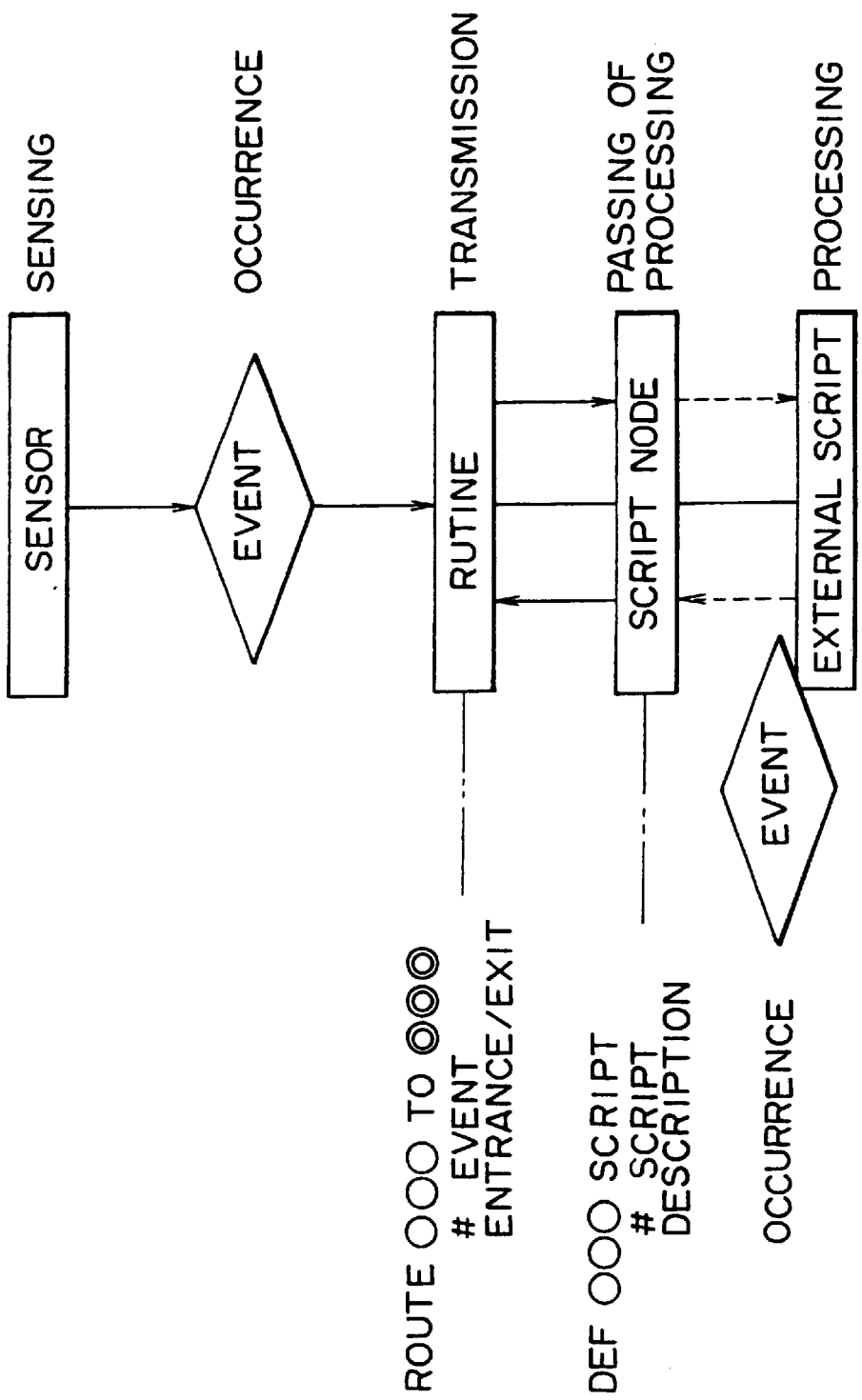
FIG. 1 is a diagram illustrating a relationship between a sensor, an event, a routing, and a script.

This invention will be described in further detail by way of example with reference to the accompanying drawings.

First, there will be described VRML (Virtual Reality Modeling Language), which is a descriptive language enabling users to integrally handle three-dimensional information by use of the framework of the WWW (World Wide Web) for providing a variety of information through the Internet, a computer network built worldwide.

Meanwhile, for an information providing system available on the Internet, the WWW developed by CERN (European Center for Nuclear Research) in Switzerland is known. This technology allows a user to browse information including text, image and voice for example in the hyper text form. Based on HTTP (Hyper Text Transfer Protocol), the information stored in a WWW server terminal is sent asynchronously to terminals such as personal computers.

The WWW server is constituted by server software called an HTTP daemon and an HTML file in which hyper text information is stored. The wording "daemon" means a program for executing management and processing in the background upon working on UNIX. The hyper text information is described in a description language called HTML (Hyper Text Makeup Language). In the description of a hypertext by HTML, a logical structure of a document is expressed in a format specification called a tag enclosed by "<" and ">". Description of linking to other information is made based on link information called an anchor. A method in which a location at which required information is stored by the anchor is URL (Uniform Resource Locator).

A protocol for transferring a file described in HTML on the TCP/IP (Transmission Control Protocol/Internet Protocol) network is HTTP. This protocol has a capability of transferring a request for information from a client to the WWW server and the requested hyper text information stored in the HTML file to the client.

Used by many as an environment for using the WWW is client software such as Netscape Navigator (trademark of Netscape Communications Corp.) called a WWW browser.

Use of the WWW browser allows users to browse files, which are called home pages, corresponding to URLs stored in WWW servers on the Internet built worldwide, thereby performing net-surfing by sequentially following home pages linked to each other to access a variety of WWW information sources.

Recently, a VRML browser has been developed by extending this WWW. The VRML browser displays a three-dimensional space described in a three-dimensional graphics language called VRML that enables description of a three-dimensional space and setting of hypertext links to objects drawn in three-dimensional graphics, thereby allowing users to follow these links to sequentially access WWW servers.

Details of VRML are described in the Japanese translation of "VRML: Browsing & Building Cyberspace," Mark Pesce, 1995, New Readers Publishing, ISBN 1-56205-498-8, the translation being entitled "Getting to Know VRML: Building and Browsing Three-Dimensional Cyberspace," translated by Kouichi Matsuda, Terunao Gamaike, Shouichi Takeuchi, Yasuaki Honda, Junichi Rekimoto, Masayuki Ishikawa, Takeshi Miyashita and Kazuhiro Hara, published Mar. 25, 1996, Prenticehall Publishing, ISBN4-931356-37-0, as well as "Most Recent Trend of VRML And CyberPassage," Koichi Matsuda and Yasuaki Honda, the bit Magazine, Kyoritsu Publishing, 1996, Vol. 28, No. 7, pp. 29–36, No. 8, pp. 57–65, No. 9, pp. 29–36, No. 10, pp. 49–58.

The authorized and complete specifications of the Virtual Reality Modeling Language Version 2.0, ISO/IEC CD 14772 released on Aug. 4, 1996 are well known to one of skill in the art.

Further, for the browser for VRML 2.0 and the software for shared server, Sony Corporation, the present applicant, has developed and commercialized "Community Place Browser/Bureau" (registered trademark), the details of which are known to one of skill in the art.

To build a three-dimensional space by use of VRML 2.0, a VRML file for representing a desired content is created by generating graphics data indicative of the shape and behavior of an object (or a model) in the virtual space by use of VRML (model creation), adding the model in the virtual space displayed on the screen to a switch (or a sensor) for generating an event when the user clicks the model with the mouse for example, programming (or scripting) a script for realizing an event to be generated when the sensor is pointed, and relating (or routing) between graphics data and script (hereafter, common nodes such as write specified in graphics data, script, and VRML are also generically referred to as nodes) such as operating the sensor and starting the script.

The following describes a mechanism for realizing an autonomous behavior in a VRML space, a new capability added to the second generation VRML 2.0, not found in the first generation VRML 1.0.

VRML 2.0 realizes an autonomous movement (Behavior) of an object according to an event to be caused by an operation performed on the object arranged in a three-dimensional virtual reality space and a timer event that occurs when a preset time has been reached. The mechanism of this Behavior is realized by the cooperation of three elements; sensor, routing, and script as follows.

(1) A sensor node described as a VRML file related to a node such as an object arranged in a three-dimensional virtual reality space beforehand senses an external event based on a change in its field value to generate an event in a VRML scene.

(2) The generated event is transmitted to an external script, which is a program for specifying the behavior of the object based on a routing described as a VRML file.

(3) The external script describes beforehand a method to be called when a particular event is received. The external script, which has received the event transmitted by the routing, executes the processing based on the description and then changes the value of the field of the corresponding node in the VRML scene based on the result of the processing and the description of the routing.

For sensor nodes, the VRML 2.0 defines TouchSensor that causes an event when the pointing device passes over a specified object or the same is clicked by the user, ProximitySensor that causes an event when ViewPoint (of the user) enters a specified region, and TimeSensor that is caused every time a preset time interval elapses, for example.

The following describes the mechanism of Behavior in more detail. As described above, the mechanism of Behavior is implemented by a sensor, an event, a routing, and a script.

The sensor is functionally divided into the following two types:
the type for sensing a user operation; and
the type for sensing a system change.

The sensor for sensing a user operation provides a software switch related to an object arranged in a three-dimensional virtual reality space. The sensor for sensing a system change starts a timer preset to a start time. These sensors sense these external events and convert them into events inside VRML.

The event indicates data for transmitting information between associated nodes in VRML. Actually, a change in a field value described in a VRML file is transmitted as an event.

The routing is a mechanism for specifying to which node an event sensed by the sensor capability is to be transmitted. Actually, the routing specifies a path of information transmission by the event.

The script provides an input/output port, performs some computation from an inputted event, and outputs a result of the computation. The script is not restricted to a particular language. In the current stage, the script can be written in Java (registered trademarks of sun Microsystems, Inc.) and JavaScript noticed in the Internet, C language widely used in ordinary systems, Tcl/Tk and Perl widely used in UNIX, or Visual Basic provided by Microsoft Corporation. Thus, VRML 2.0 does not depend on a particular script language (in the course of defining VRML 2.0 specifications, employment of VRMLScript as particular language specifications was discussed but this idea was eventually discarded).

The following describes the processing means of Behavior with reference to FIG. 1. The processing by Behavior is diagrammatically represented as shown in FIG. 1. The following describes flows of processing signals.

(1) Sensor node

As described above, the sensor node is largely classified into two types; a sensor for sensing a user operation and a sensor for sensing a system change.

The sensor for sensing a user operation has sensor nodes such as TouchSensor and PlaneSensor for sensing a mouse click on a three-dimensional object and passing of a pointing device over a plane of the three-dimensional object. The sensor for sensing a system change has TimeSensor adapted to generate an event when a preset time has been reached.

In the example of FIG. 1, it is assumed that TouchSensor is attached to a sphere. When an user clicks the sphere, this event is sensed by TouchSensor. This event is sensed because the field value of the eventOut field of TouchSensor changes. Generally, one mouse click operation generates two events; namely, the timing of pressing the mouse button and the timing of releasing the mouse button.

Then, this event is routed by the routing description part.

(2) Routing

"Route" as shown in FIG. 2 specifies routing of this event.

When an event caused in the sensor description part is transmitted to the eventout field of the Route and then to a script node to be described below, the event is passed to the external file, upon which the Behavior capability is executed.

(3) Script node

This is a node for mediating the interlocking between a VRML file and an external script. This node specifies the language in which the description is made and a file name according to the description format of the script node, and the eventIn field and the eventOut field in order to give and take the event to and from the external script file. Available script files include those written in Java, JavaScript, C language, Tcl/Tk, Perl, and Visual Basic.

In actual processing, the processing is transmitted to the script file in which the routed event is described in the script node and the external script file is executed. The external script file is received through eventIn (event entrance) defined in it and the processing described in that file is executed. When this processing has come to an end, the processing result is returned through eventOut (event exit) to the routing of the VRML file. The VRML file executes this returned result, upon which the series of Behavior processing operations come to an end.

Use of the mechanism of Behavior to be realized by the above-mentioned cooperations between the sensor, the routing, and the script allows the user to dynamically change the external view (shape, attitude, size, color, and so on) or behavioral sequence for example of an object arranged in a three-dimensional virtual space by clicking an object resembling a switch also arranged in this space.

Details of the Behavior mechanism is disclosed in Section 4 "Concept" in the Specifications "The virtual Reality Modeling Language Version 2.0," ISO/IEC CD 14772, Aug. 4, 1996, and known to one of skill in the art describes the key concepts to use of the VRML specifications. These concepts include various general node-related items such as a method of linking a node to a scene graph, a method in which a node generates or receives an event, a method of generating a node type by a prototype, a method in which a node type is added to VRML and then exported to be made available from outside, and a method of incorporating a script to operate as a program into a VRML file.

The following describes a technology in which, by application of the mechanism for realizing the above-mentioned autonomous movement (Behavior) of VRML 2.0, a virtual life object is created in a shared virtual space, growth parameters (external growth or internal growth (personality)) that change according to the generation of an event such as a user operation or passing of a predetermined time are controlled by a server, and a script program for dynamically change one or both of the external view (shape, attitude, size, color, and so on) and the behavioral sequence of the created virtual life object based on the growth parameters transferred from this server is interpreted and executed, thereby displaying the virtual life object according to the growth parameters.

Figure 3:
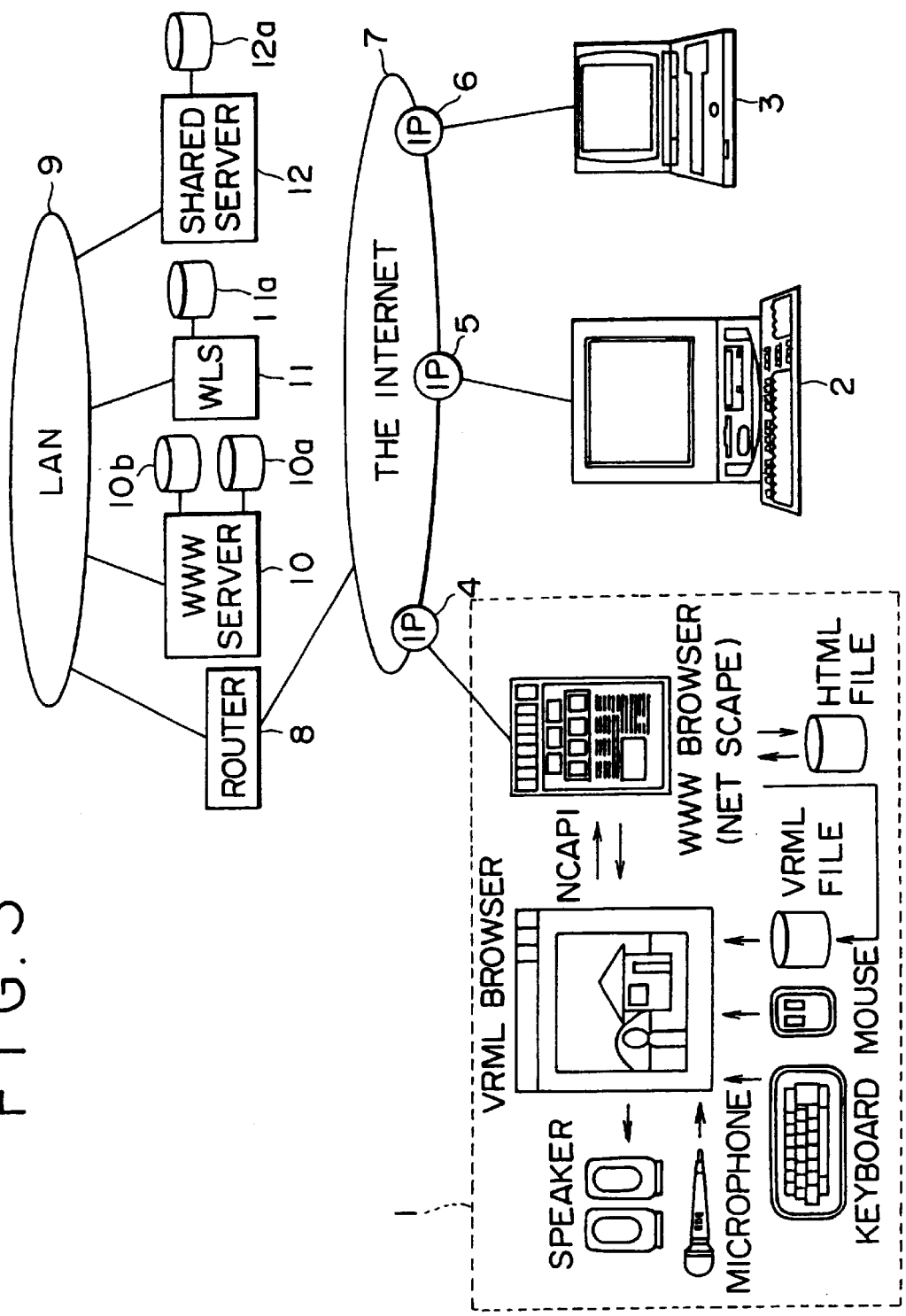
FIG. 3 is a schematic diagram illustrating a constitutional example of a shared virtual space providing system associated with the present invention.

FIG. 3 is a schematic diagram illustrating an entire system practiced as one preferred embodiment of the present invention.

In FIG. 3, reference numerals 1, 2, and 3 denote client PCs (Personal Computers) on which a VRML browser and a WWW browser are installed and operating. These PCs are connected to the Internet 7 through IPs (Internet Service Providers) 4, 5, and 6.

A LAN (Local Area Network) 9 connected to the Internet 7 through a router 8 is connected to a WWW server 10, a WLS (World Location Server) 11, and a shared server 12. The WWW server is provided with hard disks 10a and 10b. The WLS is provided with a hard disk 11a. The shared server 12 is provided with hard disk 12a.

Figure 4:
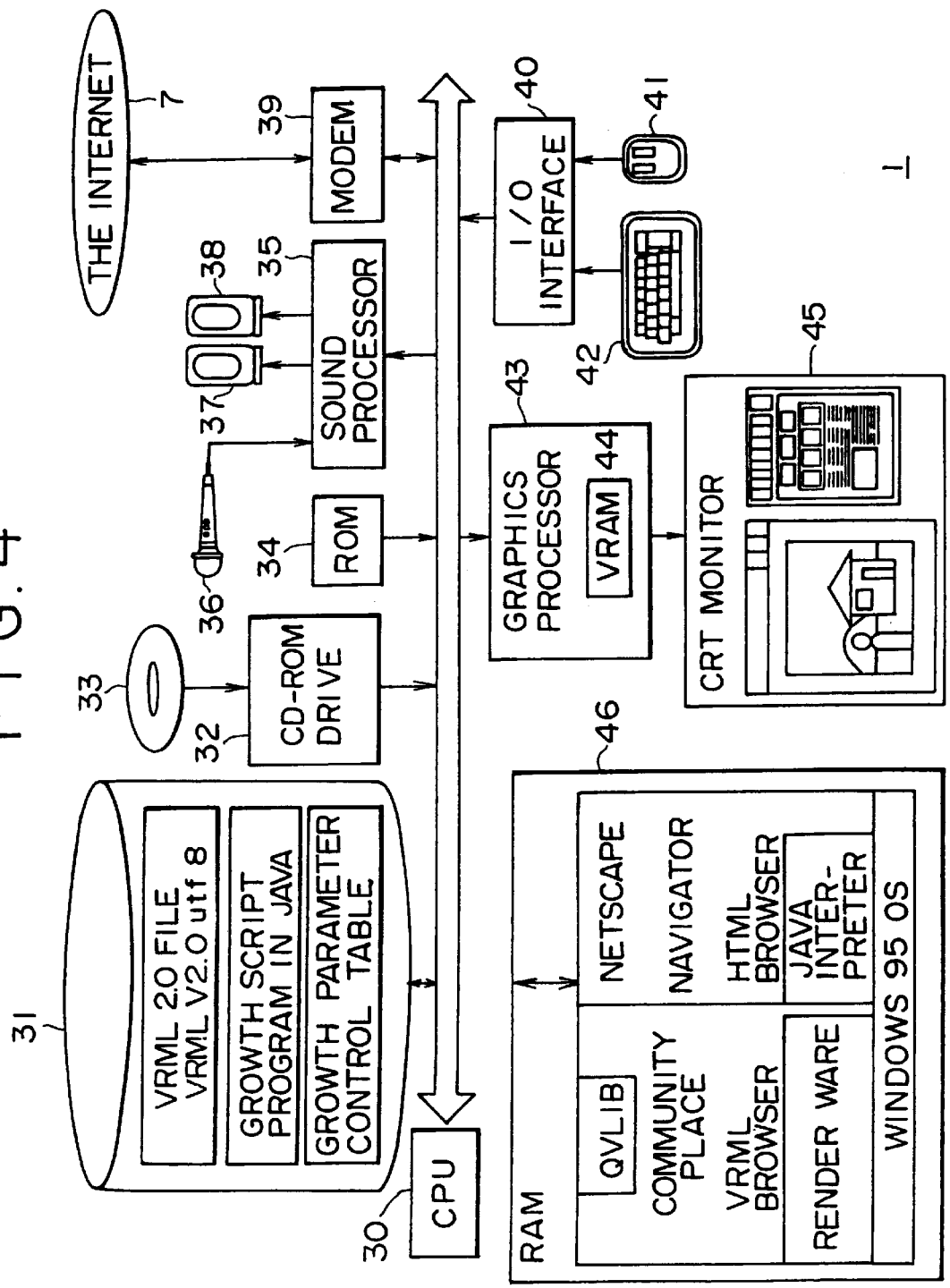
FIG. 4 is a schematic diagram illustrating a constitutional example of a client PC 1 shown in FIG. 1.

FIG. 4 is a schematic block diagram illustrating a hardware constitution of the client PC 1.

In FIG. 4, reference numeral 30 denotes a CPU (Central Processing Unit) for controlling this client PC. Reference numeral 31 denotes a hard disk storing VRML contents including a VRML 2.0file, a growth script program for a shared virtual life by Java (registered trademark of Sun Microsystems, Inc.) and so on, and a growth parameter control table (to be described later with reference to FIG. 8) of the avatar (a virtual life object) of the user (client) of each client PC. Reference numeral 32 denotes a CD-ROM drive for reading VRML contents stored in a CD-ROM disc 33. Reference numeral 34 denotes a ROM storing a BIOS (Basic Input/Output System) and so on. Reference numeral 35 denotes a sound processor connected to a microphone 36 and left and right speakers 37 and 38. Reference numeral 39 denotes a MODEM through which this client PC is connected to the Internet. Reference numeral 40 denotes an I/O (Input/Output) interface connected to a mouse 41 and a keyboard 42. Reference numeral 43 denotes a graphics processor incorporating VRAM (Video RAM) 44. Reference numeral 45 denotes a CRT monitor. Reference numeral 46 denotes a RAM.

In the RAM 46, Netscape Navigator, which is a WWW browser operating on Windows 95 (registered trademark of Microsoft Corporation), the Java interpreter, and Community Place Browser, which is a VRML 2.0browser developed by Sony Corporation, are read at run time and are ready for execution by the CPU 30.

The VRML 2.0browser is installed with QvLib, which is a VRML syntax interpreting library (parser) developed by Silicon Graphics, Inc. in U.S.A. and offered without charge, RenderWare, which is a software renderer developed by Criterion Software Ltd. in England, and so on or other parser and renderer having equivalent capabilities.

As shown in FIG. 3, Community Place Browser transfers data of various types with Netscape Navigator, a WWW browser, based on NCAPI (Netscape Client Application Programming Interface) (registered trademark).

Receiving an HTML file and VRML content (including a VRML file and a script program written in Java) from the WWW server 10, Netscape Navigator stores them in the local HDD (Hard Disk Drive) 31. Netscape Navigator processes the HTML file to display text and images on the CRT monitor. On the other hand, Community Place Browser processes the VRML file to display a three-dimensional virtual space on the CRT monitor and changes the behavior of the object in the three-dimensional virtual space according to the result of processing of the script program by the Java interpreter.

It should be noted that the other client PCs 2 and 3 have generally the same constitutions, not shown, as that of the PC 1 described above.

The following describes the operation of the above-mentioned preferred embodiment.

First, a sequence spanning from actually downloading the VRML content through the Internet to providing a multi-user environment in which one virtual space is shared by plural users is described with reference to FIGS. 5 through 7.

Figure 5:
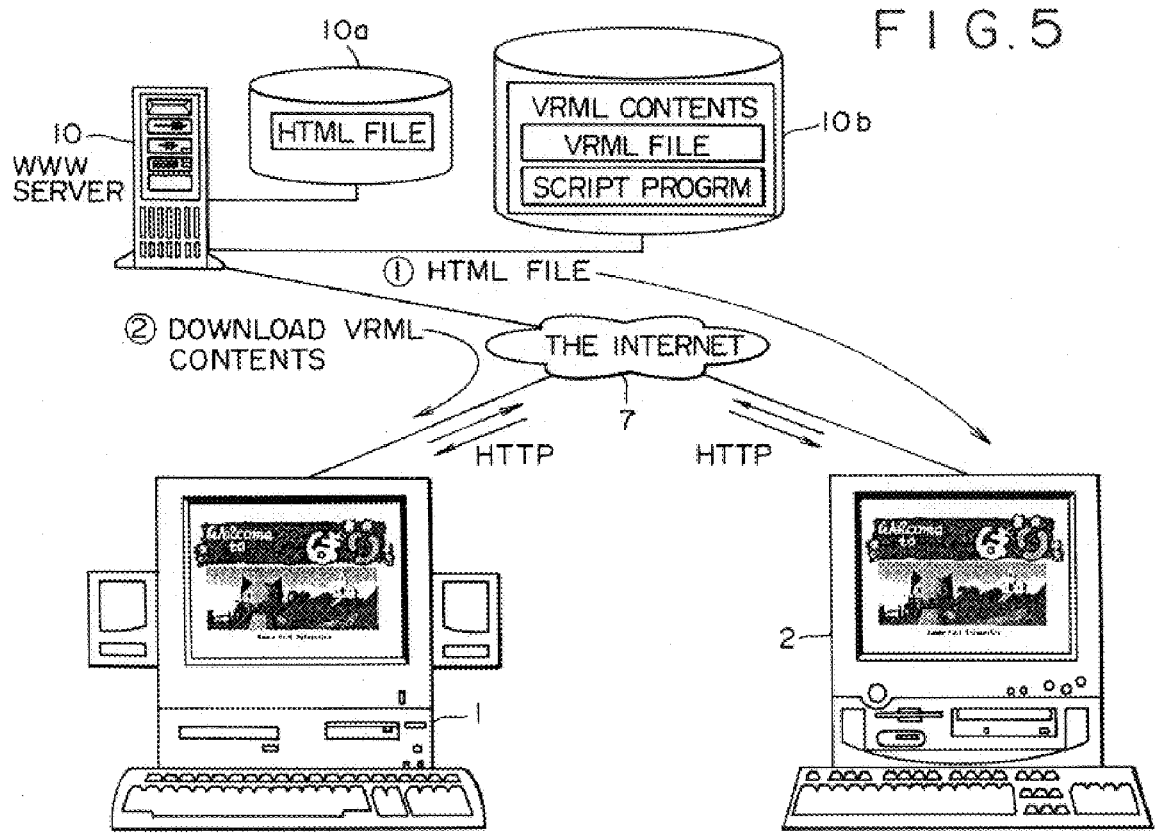
FIG. 5 shows display photographs for describing an operation of the system shown in FIG. 3.

Referring to FIG. 5, the home page of the Web site that provides the VRML content is browsed by use of the WWW browser as shown in (1). In this example, home page http://pc.sony.co.jp/sapari/ is browsed. Next, as shown in (2), the users of the client PC 1 and the client PC 2 download the VRML content composed of the VRML 2.0 file and the script program (the growth script program written in Java) for realizing an autonomous movement (Behavior) in the VRML space.

Obviously, the VRML content provided in the CD-ROM disc 33 may be read by the CD-ROM drive 32.

Figure 6:
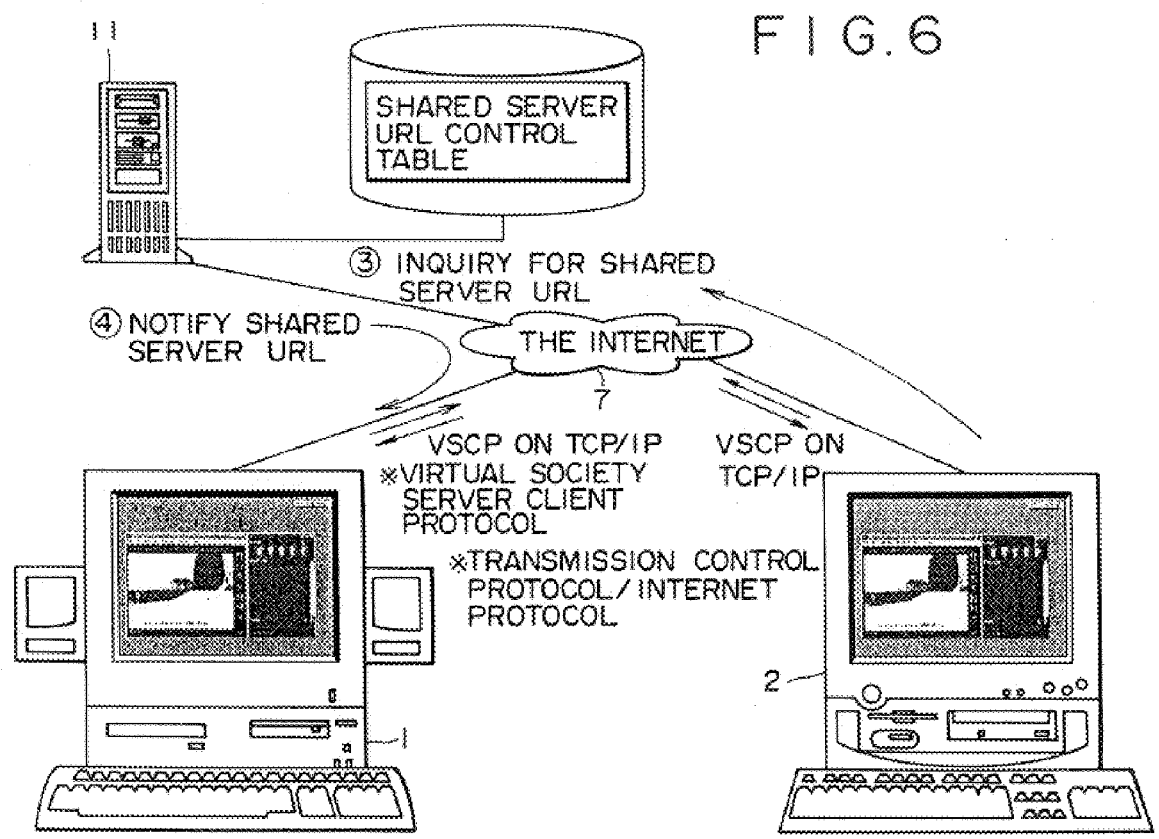
FIG. 6 shows display photographs for describing another operation of the system shown in FIG. 3.

Then, as shown in FIG. 6, in the client PC 1 and the client PC 2, the VRML 2.0file downloaded and stored in the local HDD 31 is interpreted and executed by Community Place Browser, which is a VRML 2.0browser. Next, as shown in (3), the client PCs ask the WLS 11 for the URL of the shared server 12 based on VSCP (Virtual Society Server Client Protocol). In response, as shown in (4), the WLS 11 references the shared server URL control table stored in the HDD 11a and sends the URL of the shared server 12 to the client PC 1 and the client PC 2.

Figure 7:
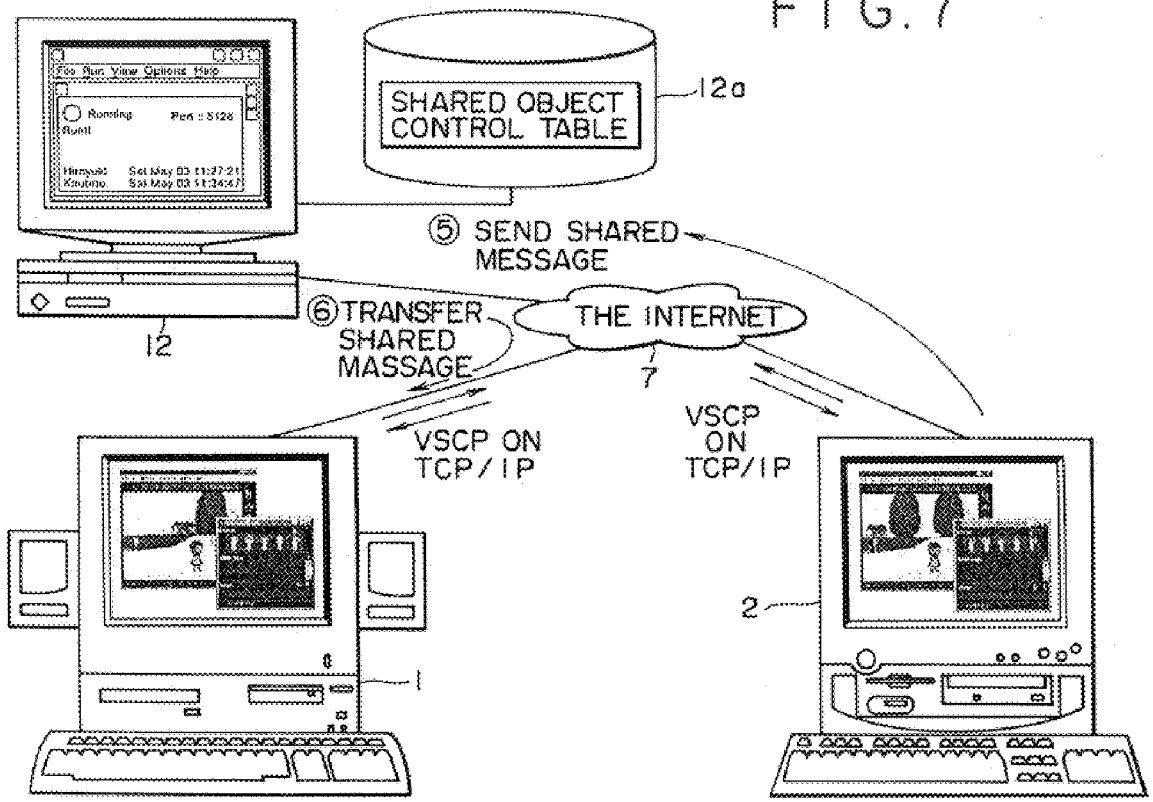
FIG. 7 shows display photographs for describing still another operation of the system shown in FIG. 3.

Using this URL, the client PC 1 and the client PC 2 are connected to the shared server 12 as shown in FIG. 7. As a result, as shown in (5), shared messages associated with the position and movement of the shared 3D object are transmitted through this shared server 12. These messages are transferred as shown in (6) to realize the multi-user environment.

For detailed description of the procedure of the above-mentioned connection, refer to Japanese Patent Laid-open No. Hei 9-81781.

The HDD 31 of each client PC stores the growth parameter control table for controlling the growth parameters of the avatar of the user of each client PC.

Figure 8:
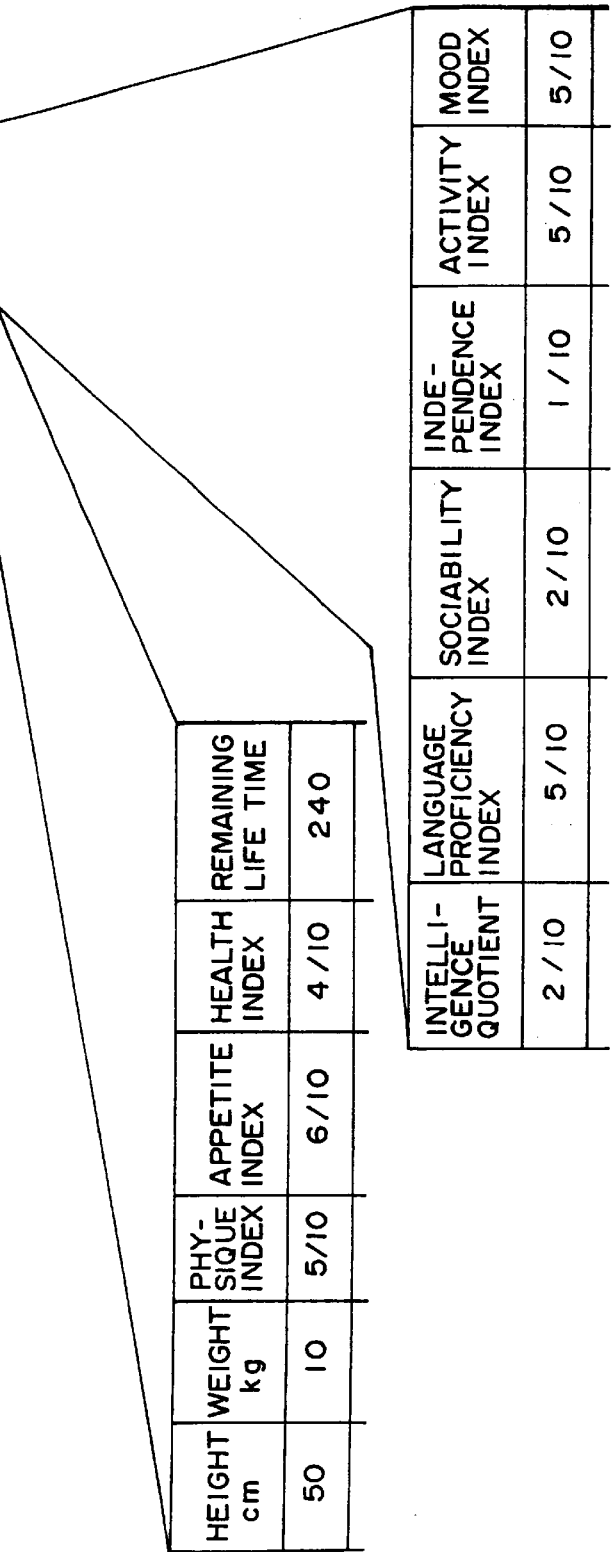
FIG. 8 is a diagram illustrating an example of a growth parameter control table.

To be more specific, as shown in FIG. 8, the data about avatar growth parameters include a 3D object ID for uniquely identifying an 3D object in one virtual space, three-dimensional coordinate values for the avatar in the virtual space, a type of the appearance of the avatar such as a monkey or a cat selected by the user, the gender of the avatar, a nickname of the avatar given by the user, a date initialized by the user, namely the birth date of the avatar, a world name given to the virtual space in which the avatar was created, and the growth parameters of the avatar.

The growth parameters are largely classified into physical parameters for specifying the external growth of the avatar and mental parameters for specifying the internal growth of the avatar reflecting its character.

The physical parameters are composed of height (in centimeters), weight (in kilograms), physique index, appetite index, health index, and remaining life time (in hours).

The mental parameters include intelligence quotient, language capability index, sociability index, independence index, activity index, and mood index.

These parameters are sequentially updated to values computed by a predetermined growth parameter computing equation based on a timer event caused when certain time has passed after the birth date of the avatar initialized by the user, an operation event caused when the avatar is operated by the user, and an operation event caused when the avatar is operated in the client PC of another user.

Figure 9:
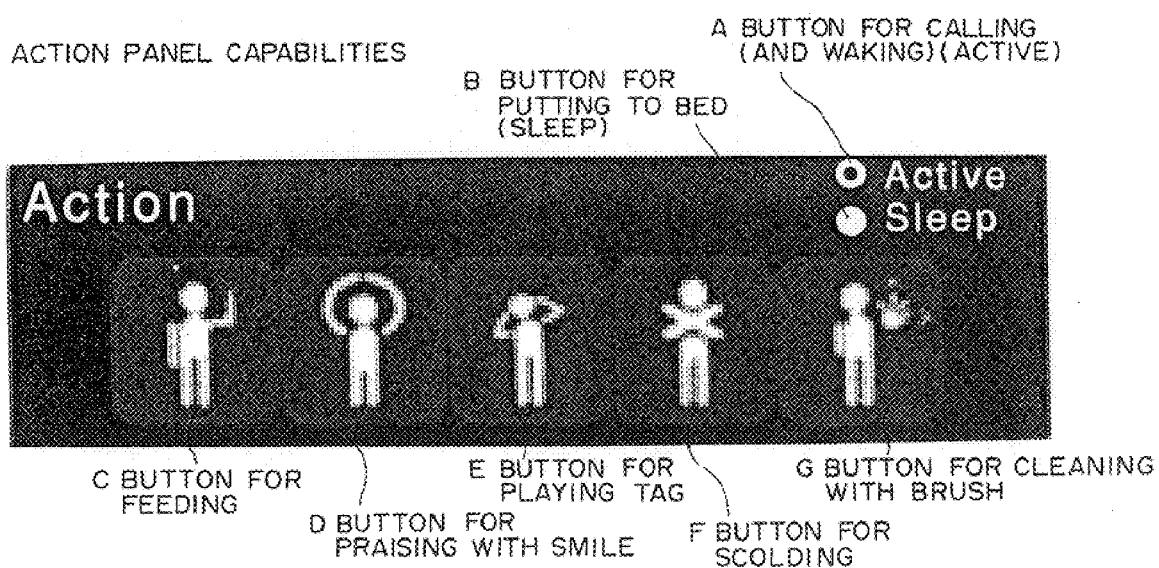
FIG. 9 shows a photograph for describing an action panel.

FIG. 9 shows capabilities of an action panel displayed beside the main window of the VRML browser on the CRT monitor screen of the client PC 1.

In FIG. 9, "A" denotes a calling button represented as "Active." This button is clicked to call the avatar of another user or wake up own avatar.

"B" denotes a button represented as "Sleep" for putting own avatar to bed.

"C" denotes a feeding button. This button is clicked to feed the avatar of another user.

"D" denotes a praise button. This button is clicked to praise the avatar of another user by smiling at it.

"E" denotes of a play button. This button is clicked to play tag, in which own avatar chases the avatar of another user until it is blocked by a wall and cannot be escaped therefrom.

"F" denotes a scold button. This button is clicked to scold the avatar of another user for discipline.

"G" denotes a groom button. This button is clicked to groom the avatar of another user by brushing.

Figure 10:
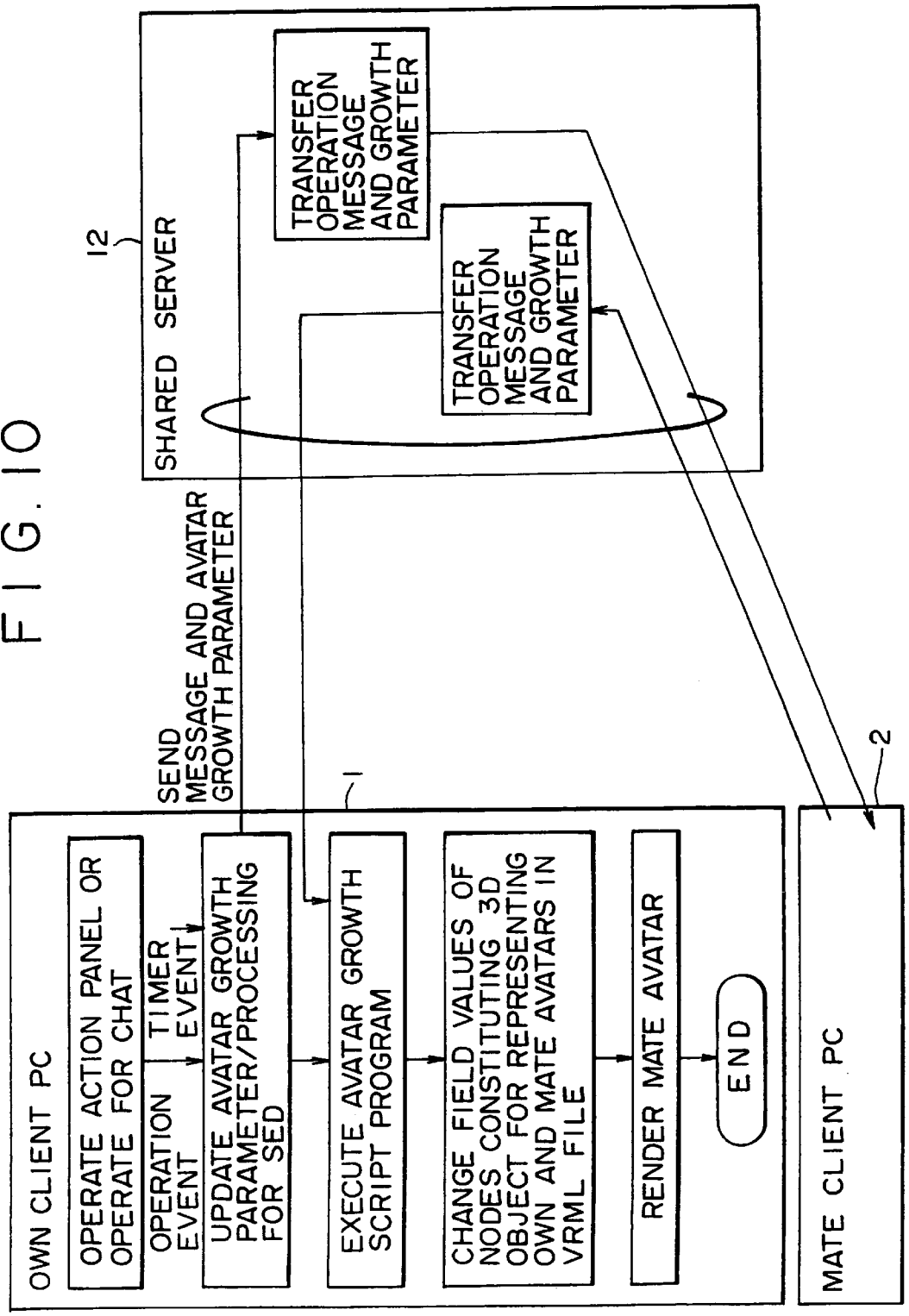
FIG. 10 is a diagram for describing passing of growth parameters.

If the call button A is clicked (the action panel is operated) in own client PC 1 as shown in FIG. 10, growth parameter update processing is executed based on this operation event. When this processing executed, the appetite index, the health index, and the mood index are incremented from $1/10$ to $10/10$ by 0.1 point. When a message indicative of this operation is transmitted to the shared server 12 along with the updated avatar growth parameters, the shared server 12 transfers the received message and parameters to the client PC 2 of another user.

If the feed button C is clicked for example, the weight, one of the growth parameters, increases every time this operation event occurs, incrementing the physique index from $1/10$ to $10/10$ by 0.1 point.

Then, when the timer event occurs as a result of passing of a predetermined time, the weight, one of the growth parameters, decreases, decrementing the physique index by 0.1 point.

For example, the growth parameters including this physique index are transferred to the other client PCs sharing the virtual space by multicast processing of the shared server 12 every time the growth parameters are updated.

The client PC 1 executes the growth script program described with a processing procedure for controlling the autonomous behavior resulted from the avatar growth based on the growth parameters coming from the other client PCs, changes the field values of the nodes constituting the 3D object for representing the avatars in the VRML file, performs rendering on the avatars on which the changed field values are reflected, and displays the rendered avatars on the main window of the VRML browser on the CRT monitor screen of the client PC 1.

The same processing performed by the client PC 1 is also performed on the other client PCs sharing the virtual space. Consequently, rendering is performed on the appearance of the avatar on which the field value changed along the growth of the avatar is reflected, and the rendered avatar is also displayed on the main window of the VRML browser on the CRT monitor of the other client PCs.

Figure 11:
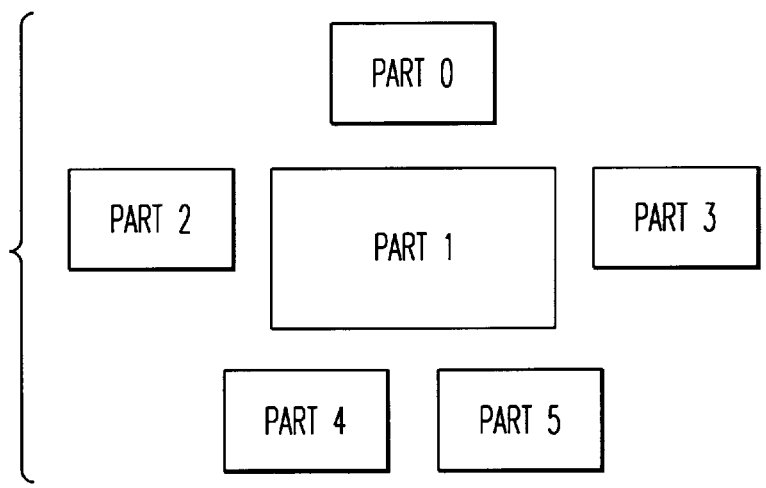
FIG. 11 is a diagram for describing avatar nodes constituting a 3D object.
Figure 12:
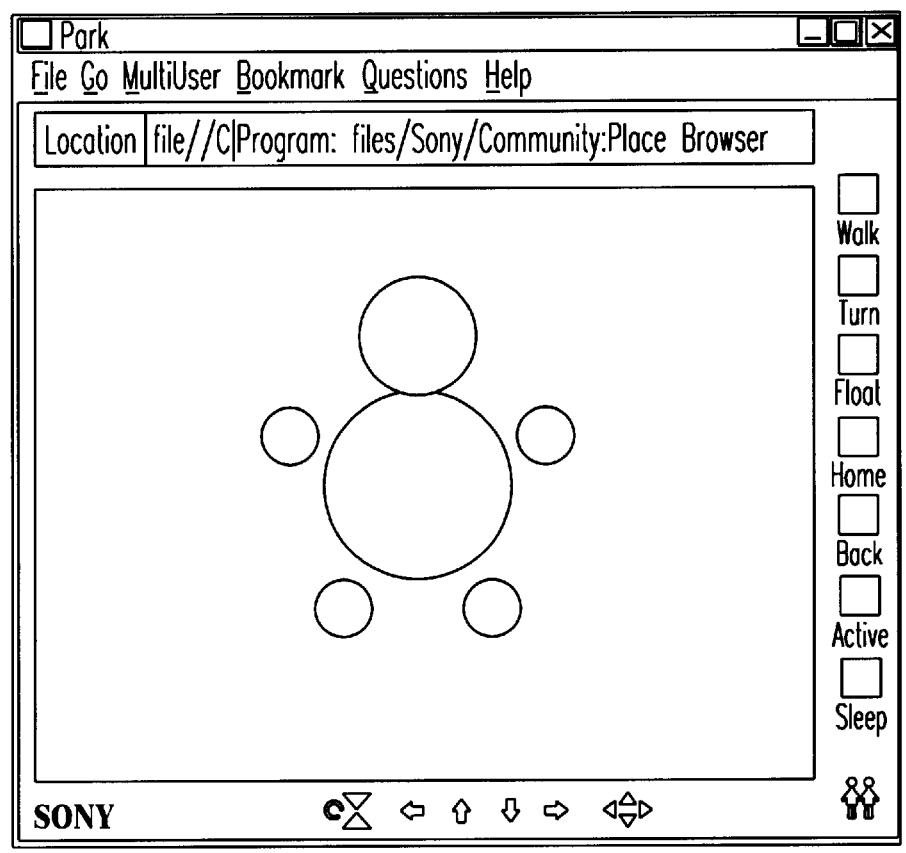
FIG. 12 shows a display photograph indicative of a display example corresponding to the nodes shown in FIG. 11.

FIGS. 11 shows a relationship between part 0 through part 5 corresponding to the nodes constituting a 3D object for representing an avatar in the VRML file. FIG. 12 shows an example of displaying these parts. Part 0 corresponds to the head of the avatar, part 1 to its body, part 2 and part 3 to its right and left arms, and part 4 and part 5 to its right and left legs.

Changing the field values of the nodes corresponding to these parts 0 through 5 can dynamically change the external view (shape, attitude (orientation), size, color, and so on) and the behavioral sequence of each part of the avatar. These are all realized by the processing of the growth script program based on the growth parameters. Namely, these are realized by use of the mechanism of Behavior to be realized by the cooperative operation between the sensor, the routing, and the script defined in VRML 2.0.

Therefore, unlike the conventional method of displaying images of a virtual creature of portable electronic pet, it is unnecessary to store the bit-map images representing each growth process of the virtual creature in the ROM beforehand. Namely, use of the mechanism of Behavior can continuously and dynamically change the physique and behavior of an avatar according to its growth process for example.

Figure 13:
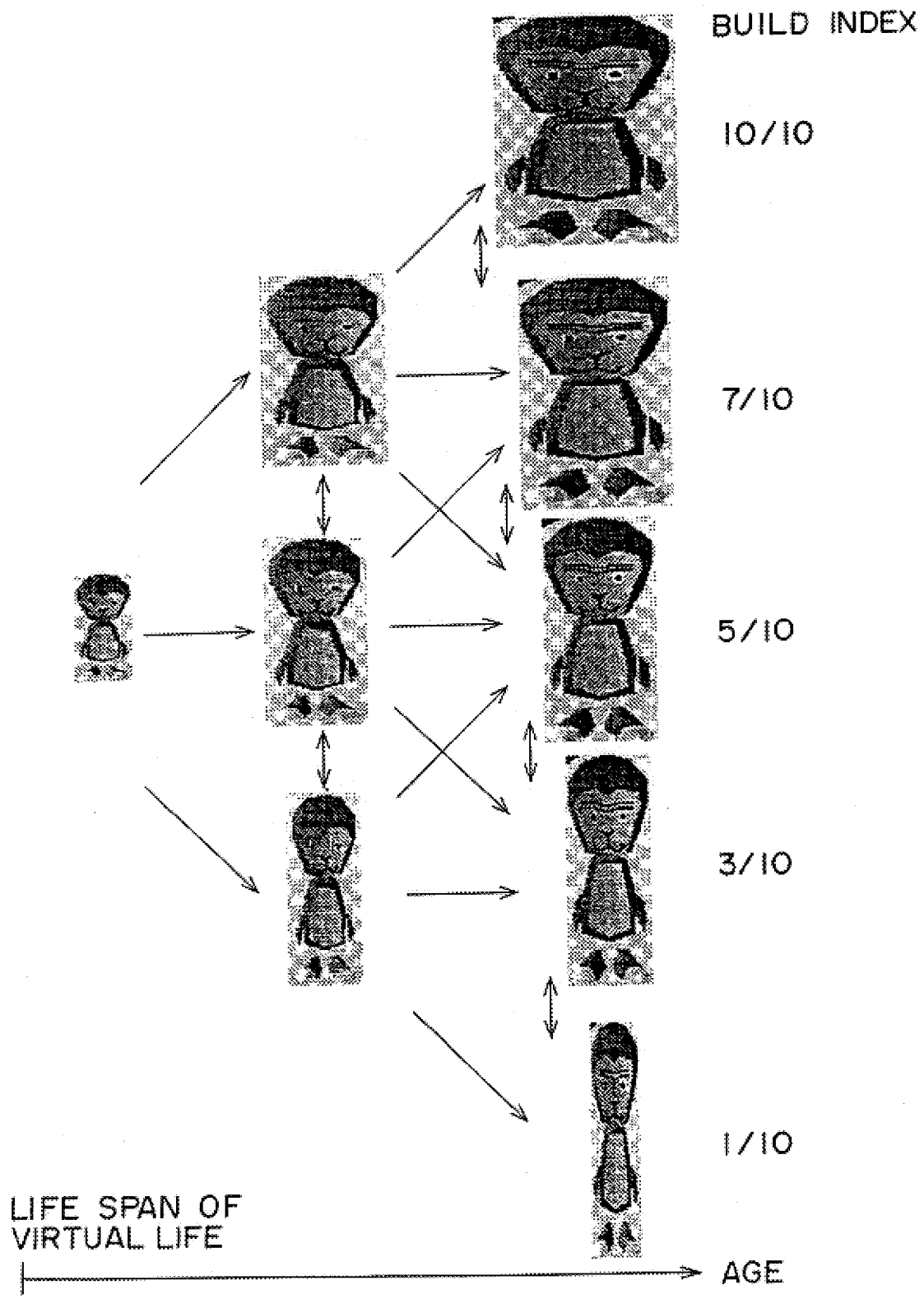
FIG. 13 is a diagram for describing avatar physique index.

FIG. 13 is a conceptual diagram in which the physique of an avatar is dynamically changed as the avatar grows and its physique index changes. As the avatar grows in age, its face becomes that of an adult and its physique becomes larger. If the physique index is small, the avatar becomes thin; if it is large, the avatar becomes thick.

FIG. 14 is a conceptual diagram in which the countenance of the avatar is dynamically changed as its mood index changes. When the mood index is high, the face of avatar smiles; when it is low, an angry expression appears on the face.

Figure 15:
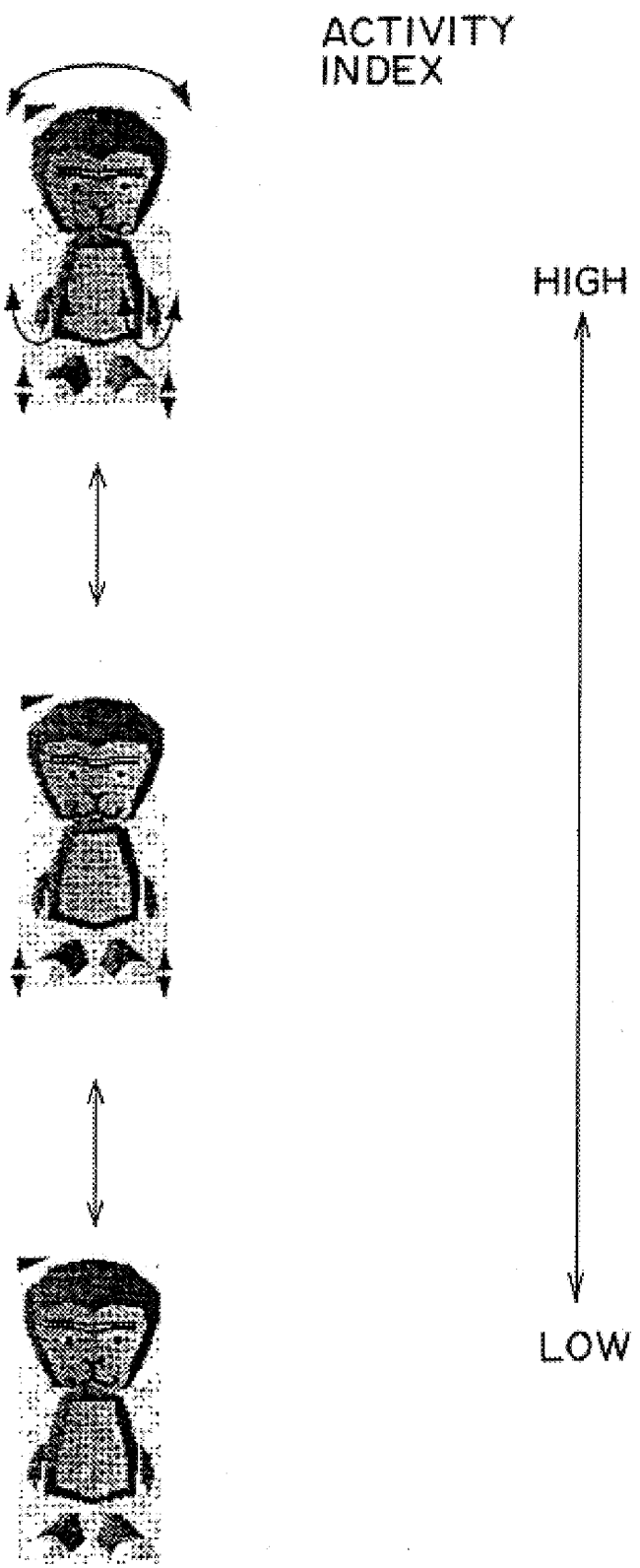
FIG. 15 is a diagram for describing avatar activity index.

FIG. 15 is a conceptual diagram in which the behavioral sequence of each part of the avatar is dynamically changed as the activity index of the avatar changes. When the activity index is low, only a small movement such as bending of knees; when it high, the avatar can wave its arms or shake its head for example.

Figure 16:
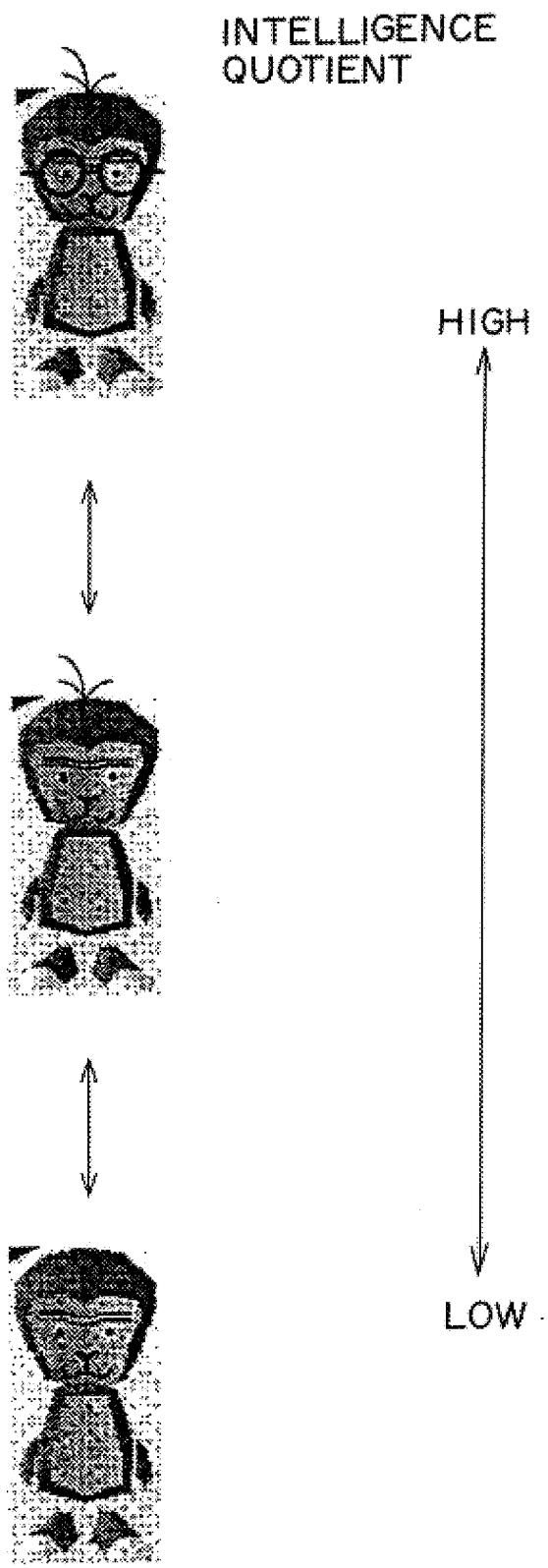
FIG. 16 is a diagram for describing avatar intelligent quotient.

FIG. 16 is a conceptual diagram in which hair is added to the avatar or glasses are put on it as the intelligence quotient of the avatar changes.

The intelligence quotient, one of the growth parameters, is incremented by 0.1 point based on the access event caused by the operation of the call button A shown in FIG. 9, thereby changing the appearance of the avatar as shown in FIG. 16.

The language index is incremented by 0.1 point according to the age of the avatar based on the access event caused by the operation of the call button A shown in FIG. 9 or the timer event, thereby changing the style of text in chat sentence editing processing.

The sociability index is incremented or decremented by 0.1 point according to the frequency of chat with avatar of another user. If the frequency is high, sociability increases; if it is low, sociability decreases. The avatar having a sociable and positive character takes on good attitude and countenance. Conversely, the avatar having an introvert and negative character takes on poor attitude and countenance.

The independence index is incremented by 0.1 point as the avatar ages based on timer event, gradually becoming independent of the user, rejecting commands of the user for example.

The activity index is determined based on the age, appetite index, and health index, affecting the behavior of the avatar as shown in FIG. 15. Also, the activity index is incremented by 0.1 point based on the event caused by operating the play button E shown in FIG. 9, affecting the behavior of the avatar such as gradually quickening getaway. The weight of the avatar is decreased to decrement its physique index, dynamically changing its appearance as shown in FIG. 13.

The mood index is determined by the access event caused by operating the call button A shown in FIG. 9 and the access frequency based on timer event, thereby affecting the countenance of the avatar as shown in FIG. 14.

Consequently, the appearance of the avatar can be a changed according to its age, from baby to grown-up to aged. For example, the degree of inner growth is incremented by 1 for such a spontaneous activity as talking in chat, decremented by 1 for such a passive activity as being talked, incremented by 5 when the praise button D is clicked, or decremented by 5 when the scold button F is clicked.

Figure 17:
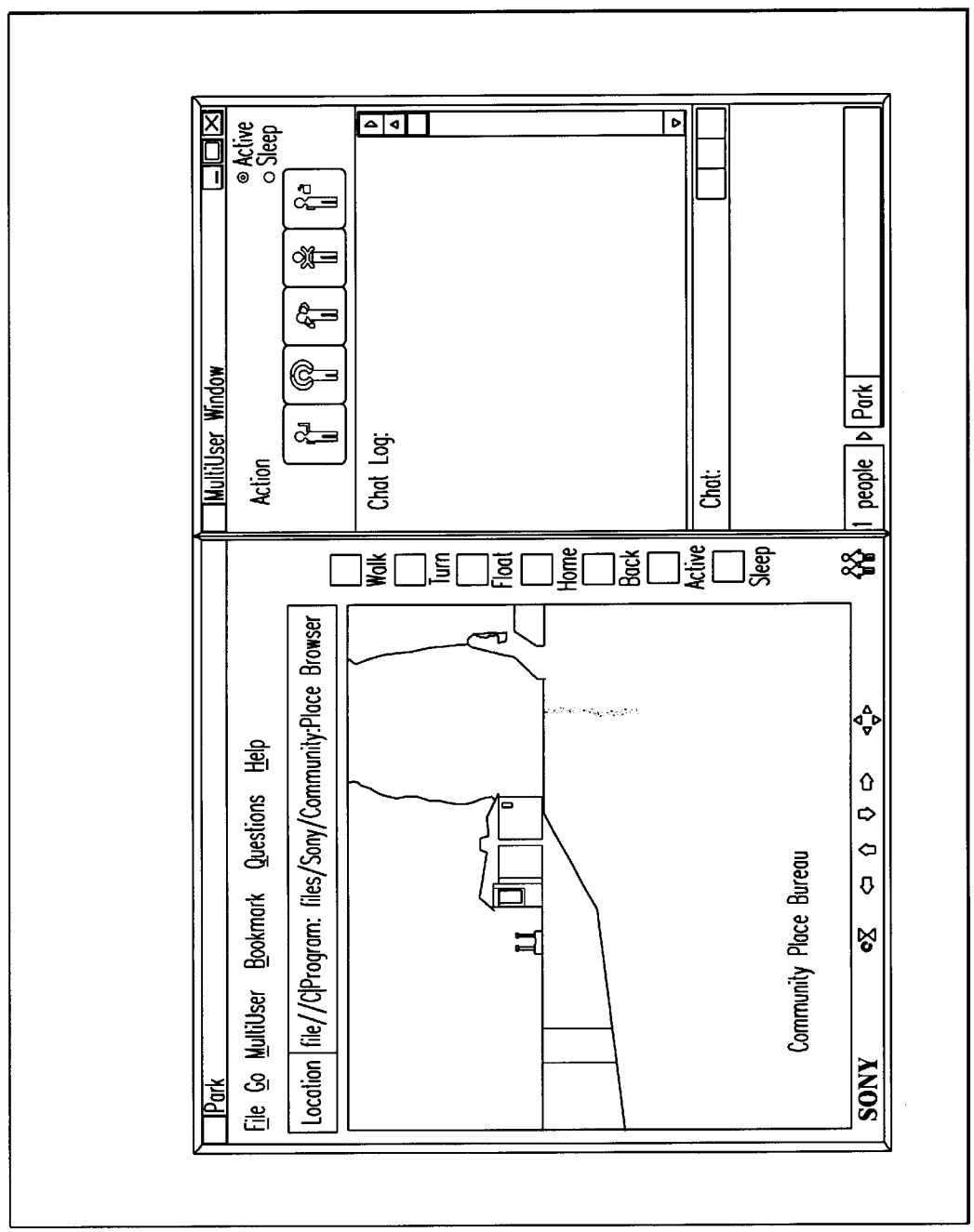
FIG. 17 shows a photograph indicative of a display example of a shared virtual space.

The following describes examples of particular displays on the CRT monitor of the client PC with reference to FIGS. 17 through 20. FIG. 17 shows an example of display to be made when the shared server 12 is accessed from the client PC 1. In this display example, message "You are connected to Community Place Browser" is superimposed on the image of a three-dimensional shared virtual space.

Figure 18:
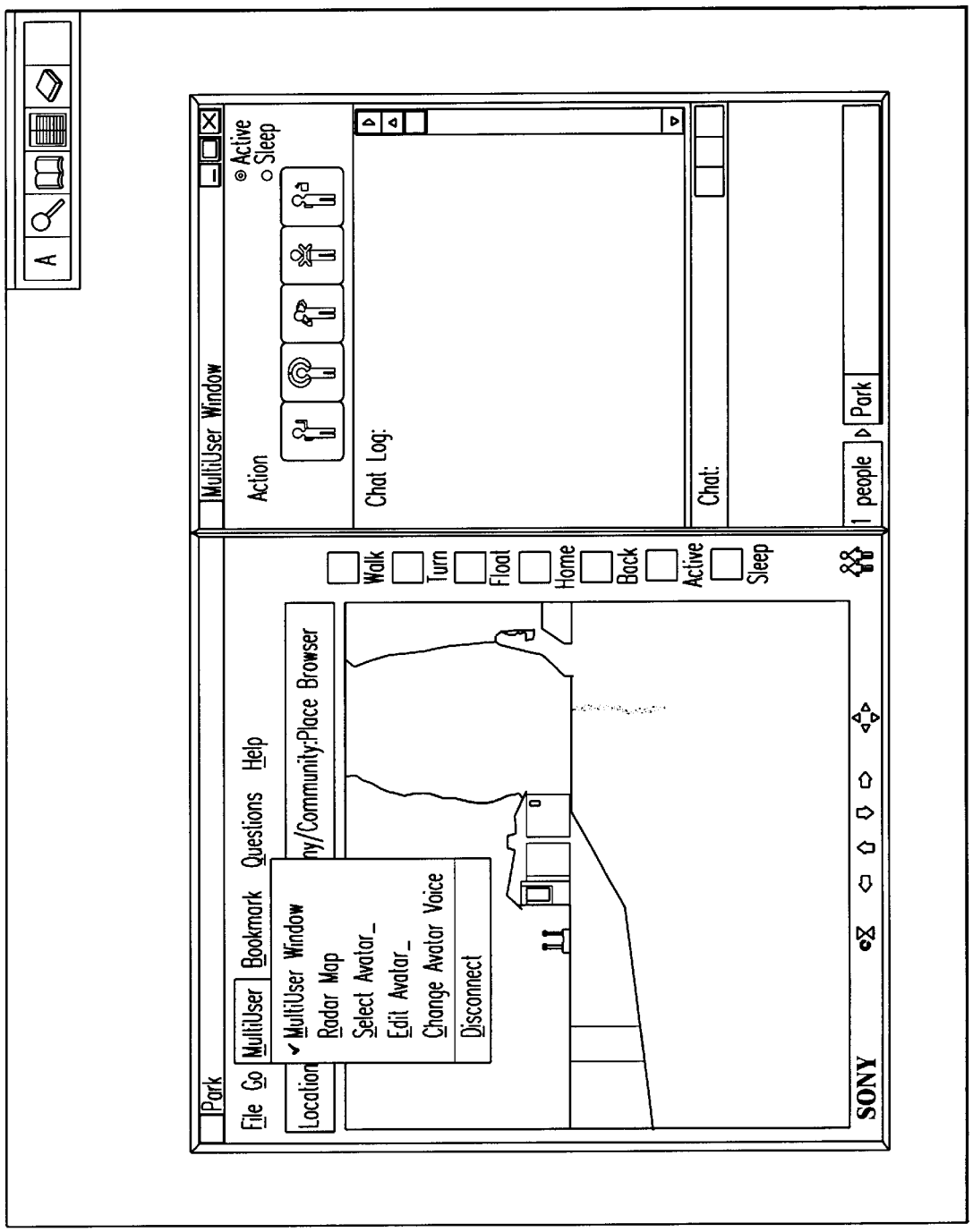
FIG. 18 shows a photograph indicative of another display example of the shared virtual space.
Figure 19:
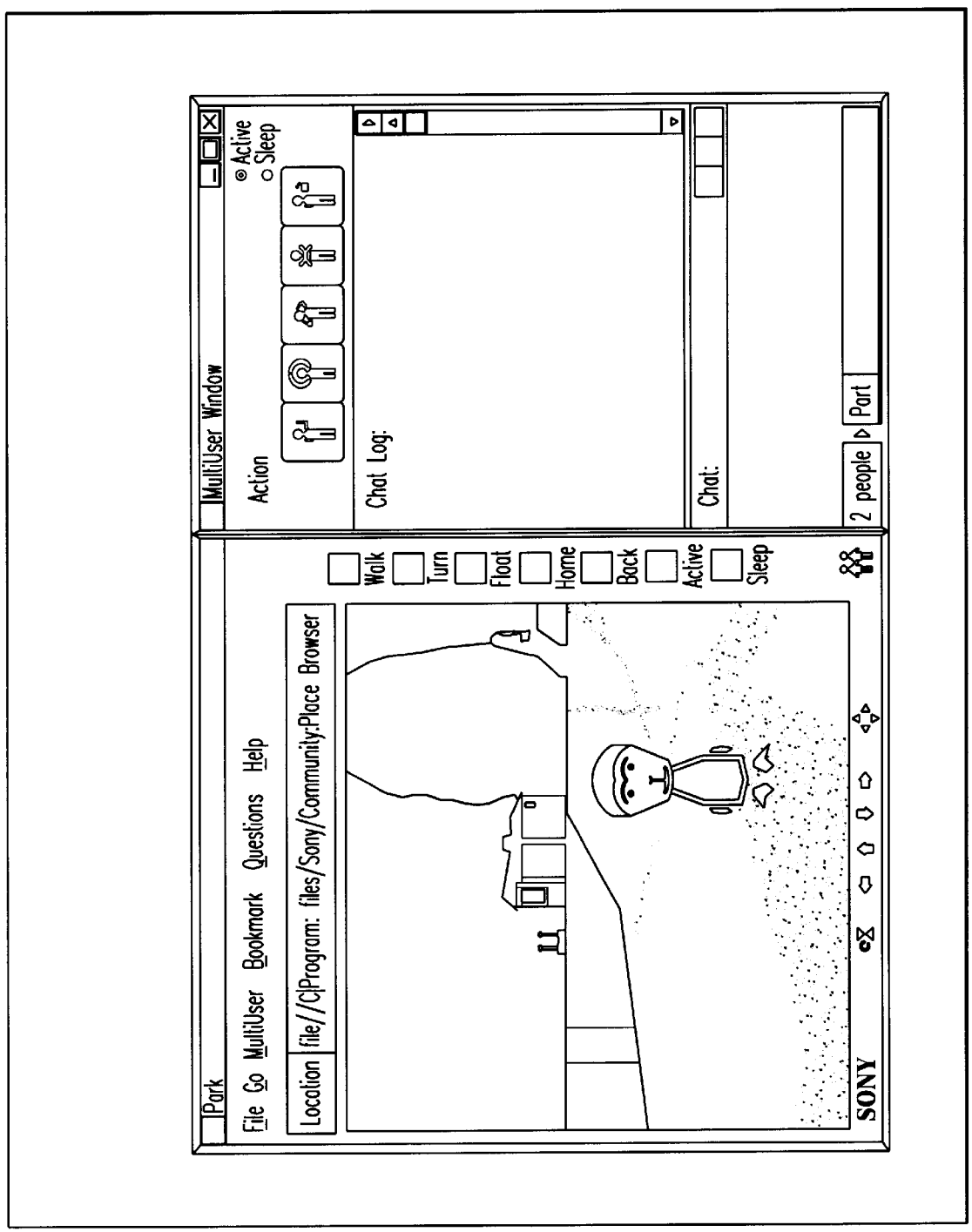
FIG. 19 shows a photograph indicative of still another display example of the shared virtual space.
Figure 20:
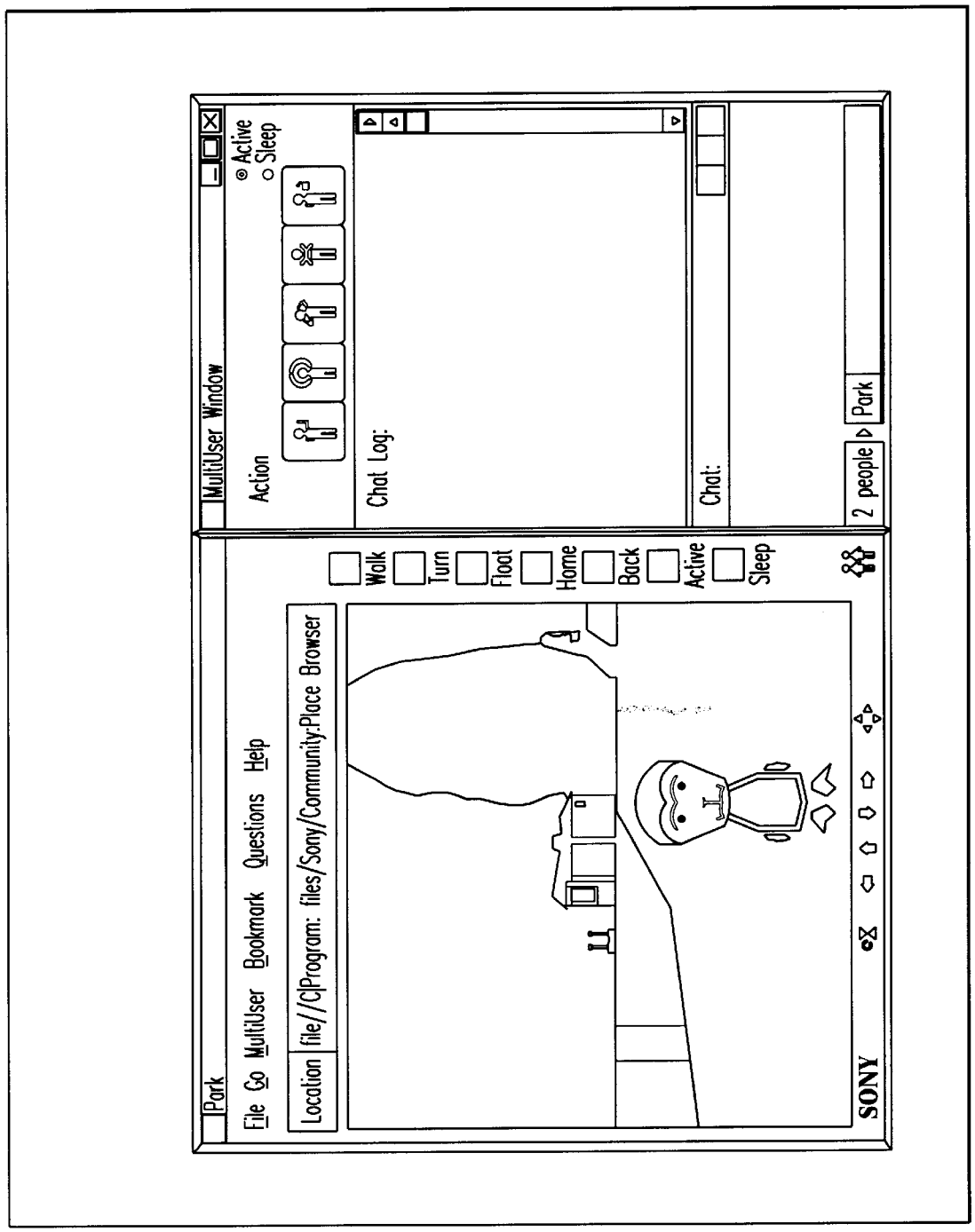
FIG. 20 shows a photograph indicative of yet another display example of the shared virtual space.

To select an avatar corresponding to a user, the user clicks "MultiUser," upon which a menu bar appears as shown in FIG. 18. To select the avatar for example, the user selects "Select Avatar." When a monkey for example is selected as the avatar, the monkey is displayed as the avatar of the client PC 1 on the CRT monitor of another client PC (for example, the client PC 2) as shown in FIG. 19. Then, this monkey avatar grows according to the growth parameters as described before. FIG. 20 shows a state in which the avatar has grown from the state shown in FIG. 19. In the state of FIG. 20, the physique of the avatar is larger in its entirety and its countenance has taken on adult countenance as compared with that of FIG. 19.

Thus, changes closer to reality can be enjoyed in a shared virtual space.

As described and according to the invention, the appearance of an avatar sent into a cyberspace as the alter ego of a user can be grown as time passes, the behavior of the avatar can be autonomously changed by forming a unique character by the user to express a growth process close to that of a real creature, and this growth representing capability of the avatar can be realized with a minimum image information resource.

It should be noted that the program for executing the above-mentioned processing operations can be provided in a floppy disc, a CD-ROM disc, or another recording medium or through the Internet.

While the preferred embodiments of the present invention have been described using specific terms, such description is for illustrative purposes only, and it is to be understood that changes and variations may be made without departing from the spirit or scope of the appended claims.

What is claimed is:

1. A client apparatus for receiving, along with another client apparatus, information about a shared virtual space from a server, comprising:
   a storage means for storing a growth parameter control table for controlling a growth parameter of a virtual life object existing in said shared virtual space as an alter ego of a user, said growth parameter changing according to occurrence of a particular event;
   an interpreting means for interpreting and executing a script and thereby generating non-bit map graphics data for dynamically changing at least one of an appearance and a behavioral sequence of said virtual life object based on said growth parameter transmitted from said another client apparatus through said server; and
   a controlling means for controlling a display such that the at least one of an appearance and a behavioral sequence of said virtual life object that has been dynamically changed by the interpreting means is displayed.

2. The client apparatus as claimed in claim 1, wherein said growth parameter is a value indicative of a degree of outer growth of said virtual life object to be calculated based on a time passed from birth of said virtual life object.

3. The client apparatus as claimed in claim 1, wherein said growth parameter is a value indicative of a degree of inner growth of said virtual life object to be calculated based on an event caused for said virtual life object.

4. The client apparatus as claimed in claim 3, wherein said event caused for said virtual life object is caused when an operation is performed by the user and a message thereof is transmitted to said another client apparatus.

5. The client apparatus as claimed in claim 3, wherein said event caused for said virtual life object is caused when an operation is performed by another user and a message thereof is received from said another client apparatus.

6. The client apparatus as claimed in claim 3, wherein, according to a type of said event caused for said virtual life object, a different value is calculated to update said degree of inner growth.

7. The client apparatus as claimed in claim 1 further comprising:
   a holding means for holding a date on which said virtual life object is set or reset;
   a counting means for counting a time that has elapsed from said date held in said holding means;
   a calculating means for calculating, based on said time that has elapsed from said date held in said holding means, said growth parameter according to an age of said virtual life object; and
   a transmitting means for updating said growth parameter control table by said growth parameter calculated by said calculating means and transmitting said growth parameter to said another client apparatus through said server.

8. An image display controlling method for controlling image display on a client apparatus provided, along another client apparatus, with information about a shared virtual space from a server, comprising the steps of:
   storing a growth parameter control table for controlling a growth parameter of a virtual life object existing in said shared virtual space as an alter ego of a user, said growth parameter changing according to occurrence of a particular event;
   interpreting and executing a script and thereby generating non-bit map graphics data for dynamically changing at least one of an appearance and a behavioral sequence of said virtual life object based on said growth parameter transmitted from said another client apparatus through said server; and
   controlling a display such that the at least one of an appearance and a behavioral sequence of said virtual life object that has been dynamically changed by the interpreting step is displayed.

9. A program providing medium for providing a program for controlling a client apparatus provided, along with another client apparatus, with information about a shared virtual space from a server, said program comprising the steps of:
   storing a growth parameter control table for controlling a growth parameter of a virtual life object existing in said shared virtual space as an alter ego of a user, said growth parameter changing according to occurrence of a particular event;
   interpreting and executing a script and thereby generating non-bit map graphics data for dynamically changing at least one of an appearance and a behavioral sequence of said virtual life object based on said growth parameter transmitted from said another client apparatus through said server; and
   controlling a display such that the at least one of an appearance and a behavioral sequence of said virtual life object that has been dynamically changed by the interpreting step is displayed.

10. A shared virtual space providing apparatus for providing information about a shared virtual space to a plurality of client apparatuses, comprising:
   a receiving means for receiving, when a first client apparatus updates a growth parameter, which changes as a predetermined event occurs, of a virtual life object existing in said shared virtual space as an alter ego of a user, the updated growth parameter; and
   a transferring means for transferring said updated growth parameter received by said receiving means to a second client apparatus, wherein said updated growth parameter is a basis of a script for generating non-bit map graphics data and thereby dynamically changing at least one of an appearance and a behavioral sequence of said virtual life object.

11. A shared virtual space method of providing information about a shared virtual space to a plurality of client apparatuses, comprising the steps of:

receiving, when a first client apparatus updates a growth parameter, which changes as a predetermined event occurs, of a virtual life object existing in said shared virtual space as an alter ego of a user, the updated growth parameter; and transferring said updated growth parameter received by said receiving means to a second client apparatus, wherein said updated growth parameter is a basis of a script for generating non-bit map graphics data and thereby dynamically changing at least one of an appearance and a behavioral sequence of said virtual life object.

12. A program providing medium for providing a program for controlling a shared virtual space providing apparatus for providing information about a shared virtual space to a plurality of client apparatuses, said program comprising the steps of:

receiving, when a first client apparatus updates a growth parameter, which changes as a predetermined event occurs, of a virtual life object existing in said shared virtual space as an alter ego of a user, the updated growth parameter; and transferring said updated growth parameter received by said receiving means to a second client apparatus, wherein said updated growth parameter is a basis of a script for generating non-bit map graphics data and thereby dynamically changing at least one of an appearance and a behavioral sequence of said virtual life object.

* * * * *